United States Patent
Taira et al.

(10) Patent No.: US 8,082,146 B2
(45) Date of Patent: Dec. 20, 2011

(54) NOISE CANCELLER USING FORWARD AND BACKWARD LINEAR PREDICTION WITH A TEMPORALLY NONLINEAR LINEAR WEIGHTING

(75) Inventors: Masaaki Taira, Akashi (JP); Masanori Kudo, Gunma (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 740 days.

(21) Appl. No.: 11/458,627

(22) Filed: Jul. 19, 2006

(65) Prior Publication Data
US 2007/0033015 A1    Feb. 8, 2007

(30) Foreign Application Priority Data

Jul. 19, 2005  (JP) ................. 2005-208653

(51) Int. Cl.
  *G10L 19/04*  (2006.01)
  *G10L 21/02*  (2006.01)
(52) U.S. Cl. ..................... 704/219; 704/228
(58) Field of Classification Search .............. 704/233, 704/230, 220, 219; 370/516
See application file for complete search history.

(56) References Cited

U.S. PATENT DOCUMENTS

| | | | | |
|---|---|---|---|---|
| 5,937,378 | A * | 8/1999 | Serizawa ............ | 704/230 |
| 6,381,272 | B1 | 4/2002 | Ali | |
| 6,408,267 | B1 * | 6/2002 | Proust ............... | 704/210 |
| 6,633,841 | B1 * | 10/2003 | Thyssen et al. ....... | 704/233 |
| 7,089,180 | B2 * | 8/2006 | Heikkinen ........... | 704/220 |
| 7,191,122 | B1 * | 3/2007 | Gao et al. ........... | 704/223 |
| 7,394,833 | B2 * | 7/2008 | Heikkinen et al. ..... | 370/516 |
| 2004/0024593 | A1 * | 2/2004 | Tsuji et al. .......... | 704/215 |
| 2004/0156397 | A1 | 8/2004 | Heikkinen et al. | |

FOREIGN PATENT DOCUMENTS

| | | |
|---|---|---|
| JP | 57-206135 | 12/1982 |
| JP | 6-112853 | 4/1994 |
| JP | 09-232980 | 9/1997 |
| JP | 2000-036768 | 2/2000 |
| JP | 2000-278153 | 10/2000 |

OTHER PUBLICATIONS

State Intellectual Property Office of P.R.C., Notification of First Office Action for Application No. 200610101138.6, Mail Date May 25, 2010.
Japan Patent Office, Notification of an Office Action for Application No. 2005-208653, Mail Date Jun. 22, 2010.

* cited by examiner

*Primary Examiner* — Talivaldis Ivars Smits
*Assistant Examiner* — Farzad Kazeminezhad
(74) *Attorney, Agent, or Firm* — SoCal IP Law Group LLP; Steven C. Sereboff; John E. Gunther

(57) ABSTRACT

A noise canceller is constituted by a forward linear prediction processor that performs forward linear prediction for a reception signal in a noisy section where the reception signal includes noise, and a backward linear prediction processor that performs backward linear prediction for the reception signal in the noisy section. A signal generator generates a replacement signal, to replace the reception signal in the noisy section, based on the forward linear prediction values obtained by the forward linear prediction and the backward linear prediction values obtained by the backward linear prediction. The signal generator obtains replacement values for a plurality of points within the noisy section by weighting the corresponding forward prediction value and the corresponding backward prediction value with an internal division ratio, the internal division ratio having a linear or nonlinear functional relationship to the time axis of the signal.

7 Claims, 9 Drawing Sheets

NOISE CANCELLER USING FORWARD AND BACKWARD LINEAR PREDICTION WITH A TEMPORALLY NONLINEAR LINEAR WEIGHTING

CROSS-REFERENCE TO RELATED APPLICATIONS

This application claims priority from Japanese Patent Application No. 2005-208653 filed on Jul. 19, 2005, which is herein incorporated by reference.

BACKGROUND OF THE INVENTION

1. Field of the Invention

The invention relates to a noise canceller and particularly to technology that can reproduce a waveform of an original signal highly accurately.

2. Description of the Related Art

Japanese Patent Application Laid-Open Publication No. 1994-112853 discloses a noise canceller including: a pulse noise detection circuit that detects pulse noise from a reception signal; a gate control circuit that holds the peak of the detected pulse noise and generates a gate control signal for a predetermined time period if the peak value is equal to a predetermined threshold value or more; and a gate circuit that gates the reception signal during the generation of the gate control signal to remove the pulse noise, and the noise canceller blocks a transmission path from the pulse noise detection circuit to the gate control circuit depending on the detection of the pulse noise. Japanese Patent Application Laid-Open Publication No. 2000-278153 discloses technology that replaces portion including overlapping noises with a signal predicted by forward linear prediction to constrain deterioration of sound quality in an FM receiver.

When the signal is predicted by the forward linear prediction as above, an error is expanded as a time difference is enlarged between a value used for the basis of the forward linear prediction (hereinafter, a basis value) and a predicted value (hereinafter, a forward linear prediction value). For example, in FIG. 9, with regard to a waveform shown in FIG. 9 (waveform shown by a solid line in FIG. 9), when a signal including noise in a section from t1 to t2 is replaced with a signal (a signal shown by a dotted line in FIG. 9) obtained from forward linear prediction values $X_{M+1}, X_{M+2}, \ldots, X_{M+N}$ predicted by the forward linear prediction based on basis values $X_1, X_2, \ldots, X_M$ to reproduce a signal in the case that the noise is not mixed (hereinafter, an original signal), an error is expanded between the basis values and the forward linear prediction values as the signal approaches $t_2$, and the waveform of the reproduced signal predicted by the forward linear prediction is significantly dissociated from the original signal in the vicinity of $t_2$. Such dissociation deteriorates reproduction quality of an AM receiver, for example.

SUMMARY OF THE INVENTION

The present invention was conceived from such a standpoint and it is therefore an object of the present invention to provide a noise canceller that can reproduce a waveform of an original signal highly accurately.

To achieve the above object, the main aspect of the present invention is a noise canceller that includes a forward linear prediction processor that performs forward linear prediction for a reception signal in a section where the reception signal includes noise; a backward linear prediction processor that performs backward linear prediction for the reception signal in the section; and a signal generator that generates a replacement signal, which is a signal replacing the reception signal in the section including the noise, based on the forward linear prediction values obtained by the forward linear prediction and the backward linear prediction values obtained by the backward linear prediction.

Since the signal is predicted by both the forward linear prediction and the backward linear prediction, the noise canceller of the present invention can reproduce the waveform of the original signal highly accurately and can improve sound quality in reproduced sound of a receiver, for example.

BRIEF DESCRIPTION OF THE DRAWINGS

To understand the present invention and the advantages thereof more thoroughly, the following description should be referenced, which is associated with the accompanying drawings.

DETAILED DESCRIPTION OF THE INVENTION

Description will hereinafter be made of a preferred embodiment of a noise canceller according to the present invention with reference to the accompanying drawings.

Figure 1:
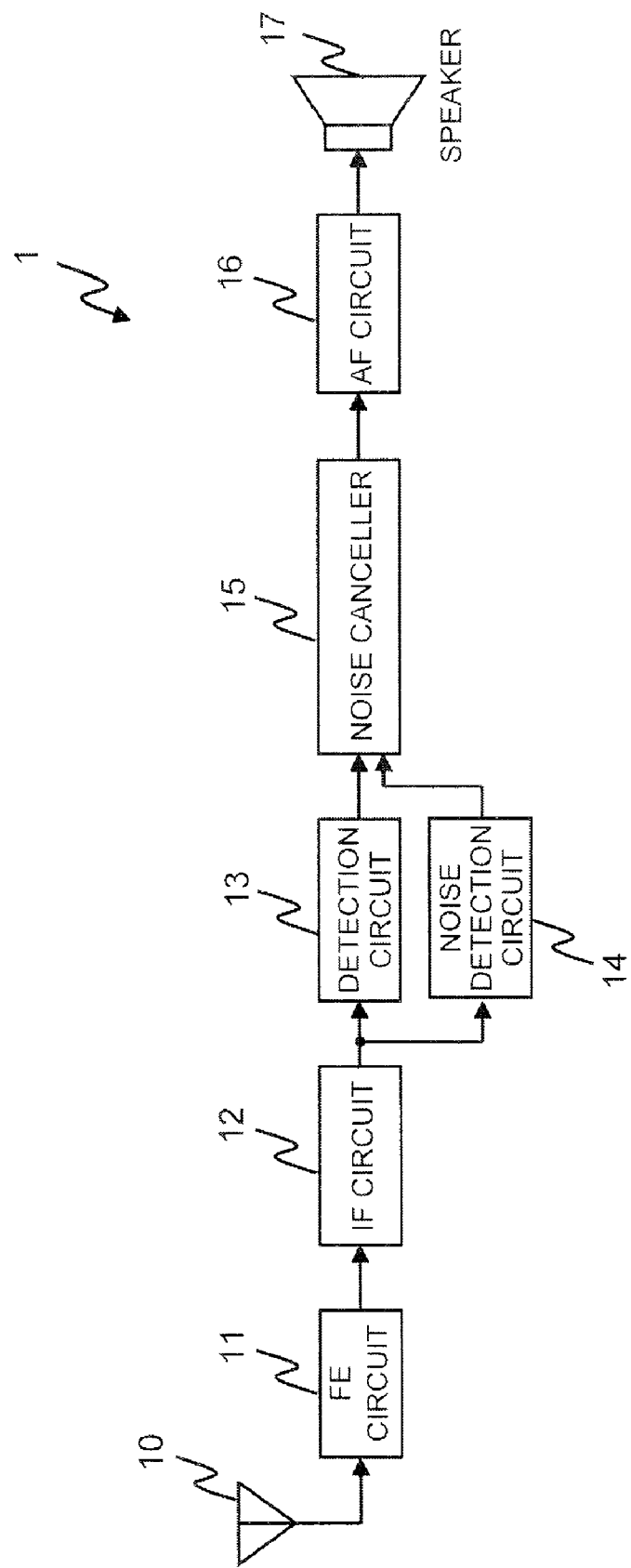
FIG. 1 shows a block configuration of an on-vehicle AM broadcasting receiver 1 according to one embodiment of the present invention.

FIG. 1 shows a block configuration of an on-vehicle AM broadcasting receiver 1 described as one embodiment of the present invention. The AM broadcasting receiver 1 is constituted by including: an antenna 10 that receives electric waves of AM broadcast; a front end (FE) circuit 11 that includes a tuning circuit and a high-frequency amplification circuit; an IF circuit 12 that includes an intermediate-frequency amplification circuit; a detection circuit 13 that performs AM detection; a noise detection circuit 14 that detects whether noise to be removed exists or not; a noise canceller 15; an AF circuit 16 that includes a low-frequency amplification circuit; and a speaker 17 that outputs sound.

Figure 2:
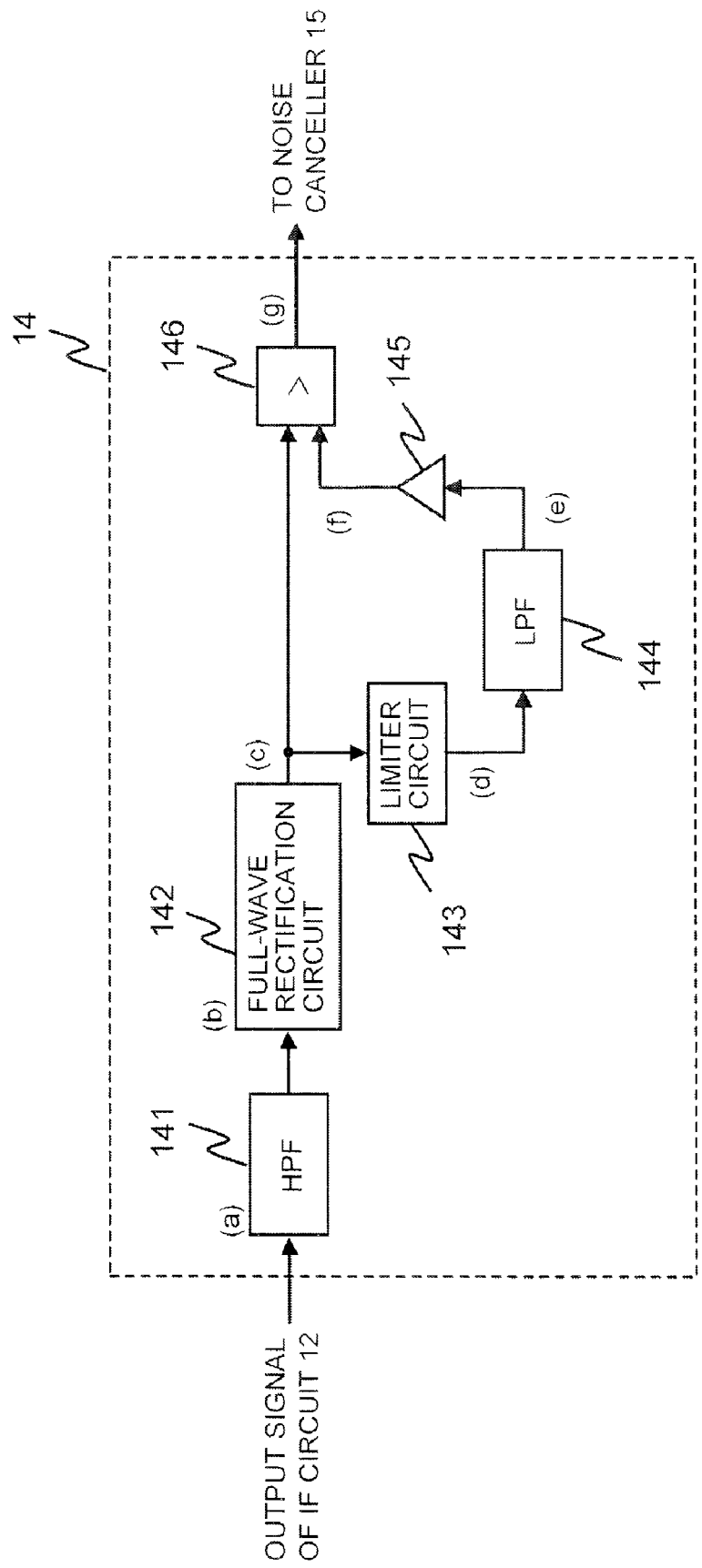
FIG. 2 shows a block configuration of a noise detection circuit 14 according to one embodiment of the present invention.

FIG. 2 shows a block configuration of a noise detection circuit 14 in the AM broadcasting receiver 1. The noise detection circuit 14 is constituted by including a high-pass filter (HPF) 141, a full-wave rectification circuit 142, a limiter circuit 143, a low-pass filter (LPF) 144, an amplifier 145, and a comparator 146. FIG. 3 is an example of a waveform of an input signal of the high-pass filter (HPF) 141, i.e., a signal output from the IF circuit 12 and input to the noise detection circuit 14. This signal includes relatively large noise in a section $t_1$ to $t_2$.

Figure 3A:
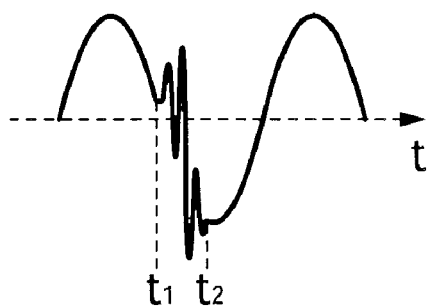
FIGS. 3A to 3G show waveforms output from each portion of the noise detection circuit 14 according to one embodiment of the present invention.
Figure 3B:
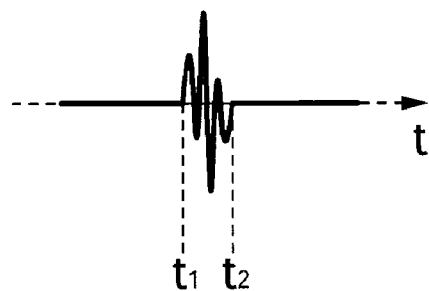
Figure 3C:
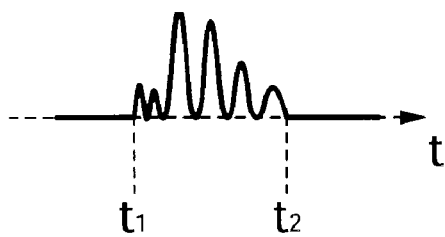
Figure 3D:
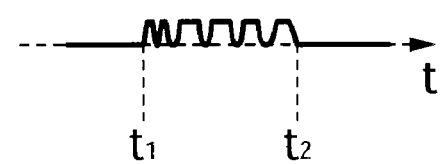
Figure 3E:
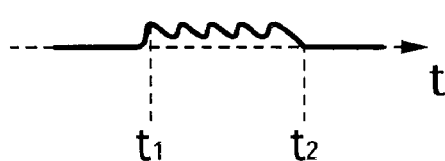

FIG. 3B is a waveform after the signal shown in FIG. 3 passes through the high-pass filter (HPF) 141 and FIG. 3C is a waveform after passing through the full-wave rectification circuit 142. The signal output from the full-wave rectification circuit 142 is input to the limiter circuit 143. The limiter circuit 143 cuts out components equal to or more than a threshold value set in advance to acquire a signal composed of a waveform shown in FIG. 3D. The waveform shown in FIG. 3D further passes through the low-pass filter (LPF) 144 and is shaped into a waveform shown in FIG. 3E, which is amplified by the amplifier 145 with an amplification factor not exceeding the signal level of FIG. 3C to acquire a waveform shown in FIG. 3F.

Figure 3F:
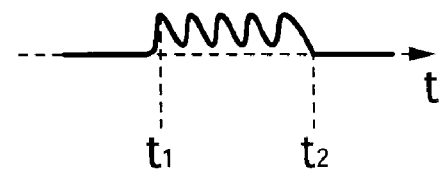
Figure 3G:
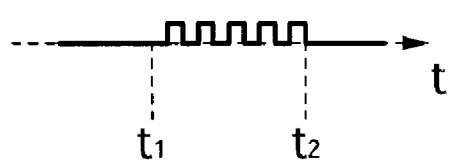

The comparator 146 compares the signal shown in FIG. 3C, which is input from the full-wave rectification circuit 142, and the signal shown in FIG. 3F, which is input from the amplifier 145, to generate, for example, a digital signal shown in FIG. 3G, which becomes "1" if the signal shown in FIG. 3C is greater than the signal shown in FIG. 3F and becomes "0" if the signal shown in FIG. 3C is equal to or less than the signal shown in FIG. 3F (the output digital signal may become "0" if the signal shown in FIG. 3C is greater than the signal shown in FIG. 3F and becomes "1" if the signal shown in FIG. 3C is equal to or less than the signal shown in FIG. 3F). In this way, the noise detection circuit 14 outputs a signal (hereinafter, noise detection signal) indicating whether the signal output from the IF circuit 12 includes noise with a predetermined amplitude.

Figure 4:
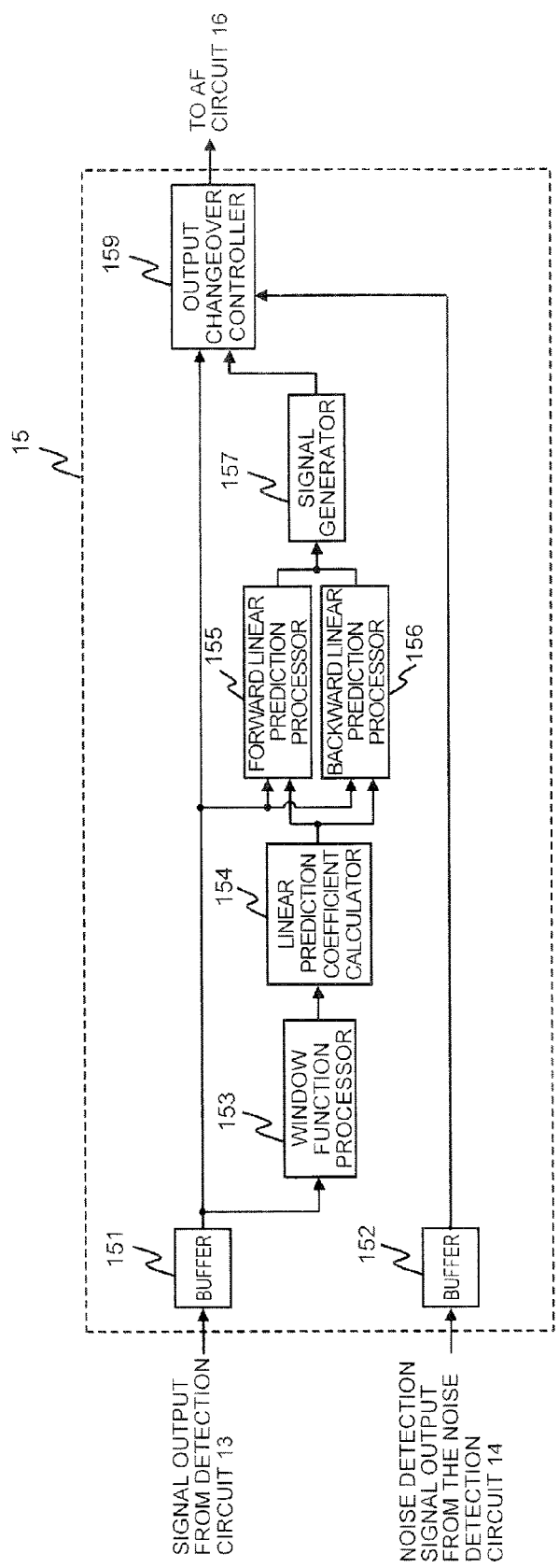
FIG. 4 shows a block configuration of a noise canceller 15 according to one embodiment of the present invention.

FIG. 4 shows a block configuration of the noise canceller 15 in the AM broadcasting receiver 1. The noise canceller 15 is constituted by including a buffer 151 (first buffer) that stores the signal output from the detection circuit 13; a buffer 152 (second buffer) that stores the noise detection signal output from the noise detection circuit 14; a window function processor 153 that performs a process relating to a window function; a linear prediction calculating unit 154 that calculates a linear prediction coefficient; a forward linear prediction processor 155 that performs a process relating to the forward linear prediction; a backward linear prediction processor 156 that performs a process relating to the backward linear prediction; a signal generator 157; and an output changeover controller 159. The noise canceller 15 is constituted by using a DSP (Digital Signal Processor), for example.

Figure 5:
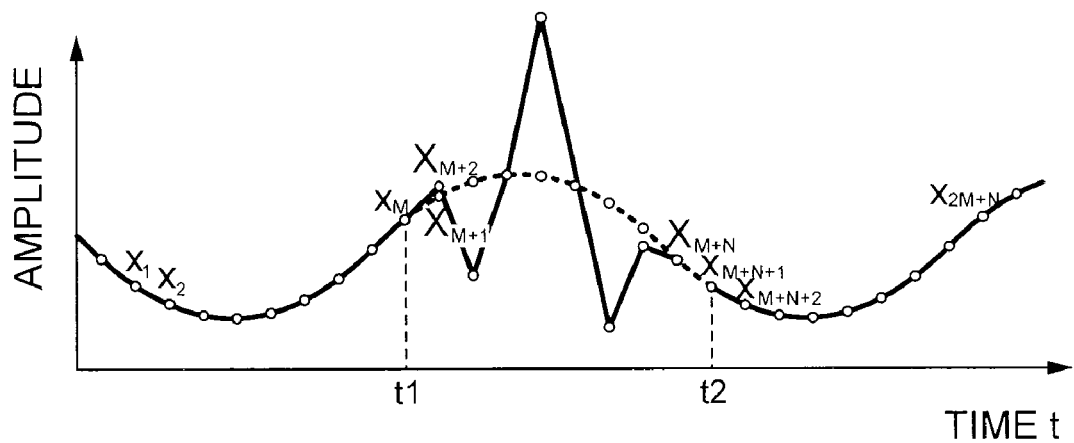
FIG. 5 shows an example of a signal including noise for describing operation of the noise canceller 15 according to one embodiment of the present invention.

The noise canceller 15 removes (cancels) noise by replacing a signal in the section including the noise of the signals output from the detection circuit 13 with a signal (hereinafter, replacement signal) generated based on the forward linear prediction values obtained when performing the forward linear prediction and the backward linear prediction values obtained when performing the backward linear prediction. FIG. 5 is an example of a waveform (waveform shown by a solid line in FIG. 5) of a signal including noise for describing operation of the noise canceller 15. This signal includes noise in a section from $t_1$ to $t_2$. The noise canceller 15 samples the basis values $x_1, x_2, \ldots, x_M$ for the forward linear prediction from this signal and substitutes the sampled basis values $x_1, x_2, \ldots, x_M$ for the following equation (1) to obtain N forward linear prediction values $y_{M+1}, y_{M+2}, \ldots, y_{M+N}$.

$$y_{M+i} = -\sum_{k=1}^{M-i+1} a_k^{[M]} x_{k+i-1} - \sum_{k=M-i+2}^{M} a_k^{[M]} y_{k+i-1} \quad (1)$$

$$(i = 1, 2, \ldots, N)$$

The noise canceller 15 samples the basis values $x_{2M+N}, x_{2M+N-1}, \ldots, x_{M+N+1}$ for the backward linear prediction from the signal and substitutes the sampled basis values $x_{2M+N}, x_{2M+N-1}, \ldots, x_{M+N+1}$ for the following equation (2) to obtain N backward linear prediction values $z_{M+N}, z_{M+N-1}, \ldots, z_{M+1}$.

$$z_{M+i} = -\sum_{k=1}^{M-i+1} a_k^{[M]} x_{2M+i+1-k} - \sum_{k=M-i+2}^{M} a_k^{[M]} z_{2M+i+1-k} \quad (2)$$

$$(i = N, N-1, \ldots, 1)$$

In equation (1), when M−i+1<1, i.e., i>M, the value of the total sum (Σ) of the first term is zero, and when M−i+2<M, i.e., i=1, the value of the total sum (Σ) of the second term is zero. In equation (2), when M−i+1<1, i.e., i>M, the value of the total sum (Σ) of the first term is zero, and when M−i+2<M, i.e., i=1, the value of the total sum (Σ) of the second term is zero. The linear prediction coefficient $a_k^{[M]}$ in equations (1) and (2) can be obtained by applying, for example, the Levinson-Durbin recursion or the Yule-Walker's equation, based on data acquired from the signal stored in the buffer 151 applied with (multiplied by) the window function suitable for a buffer size.

The noise canceller 15 then generates the replacement signal replacing the signal in the interpolation section based on the forward linear prediction values $y_{M+1}, y_{M+2}, \ldots, y_{M+N}$ acquired by performing the forward linear prediction and the backward linear prediction values $z_{M+N}, z_{M+N-1}, \ldots, z_{M+1}$ acquired by performing the backward linear prediction. The replacement signal is generated by defining the replacement signal as a value $X_{M+i}$ (i=1, 2, ..., N) divided internally by an internal division ratio $c_1:c_2$ ($c_1, c_2 > 0$) with the following equation (3), for example. FIG. 5 shows an example of the replacement signal generated in this way (a waveform shown by a dotted line portion of FIG. 5).

$$x_{M+i} = \frac{c_2 y_{M+i} + c_1 z_{M+i}}{c_1 + c_2} \quad (3)$$

$$(i = 1, 2, \ldots, N)$$

Figure 6A:
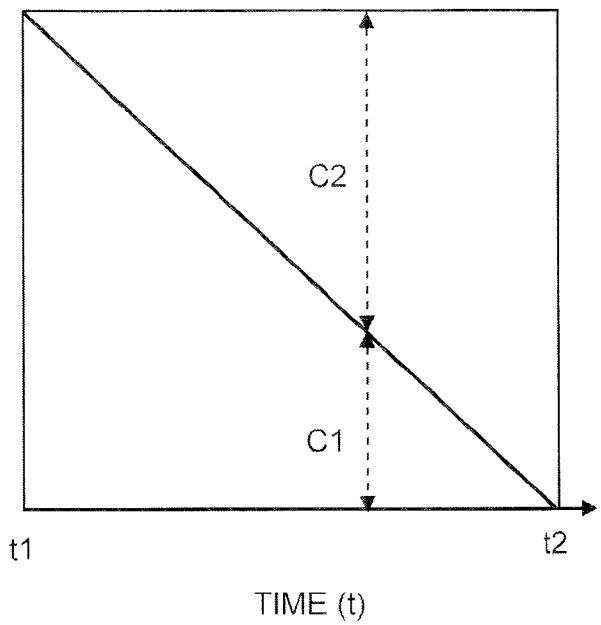
FIG. 6A shows an example of an internal division ratio $c_1:c_2$ when the replacement signal is generated based on the forward linear prediction values and the backward linear prediction values according to one embodiment of the present invention.
Figure 6B:
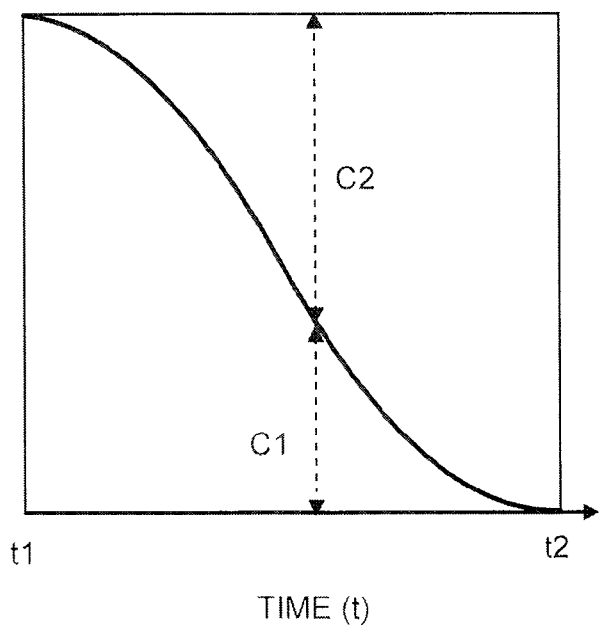
FIG. 6B shows an example of the internal division ratio $c_1:c_2$ when the replacement signal is generated based on the forward linear prediction values and the backward linear prediction values according to one embodiment of the present invention.

The internal division ratio $c_1:c_2$ is set to a value such that the forward linear prediction values and the backward linear prediction values are connected smoothly. For example, the internal division ratio $c_1:c_2$ can be set such that the relationship between $c_1$ and $c_2$ becomes a linear function relationship relative to the time axis of the original signal as shown in FIG. 6. As shown in FIG. 6B, the internal division ratio $c_1:c_2$ can also be set such that the relationship between $c_1$ and $c_2$ becomes a cubic function relationship relative to the time axis of the original signal. By setting the internal division ratio $c_1:c_2$ such that the forward linear prediction values and the backward linear prediction values are connected smoothly in this way, the sound quality of the reproduced sound of the AM broadcasting receiver 1 can be improved.

Figure 7:
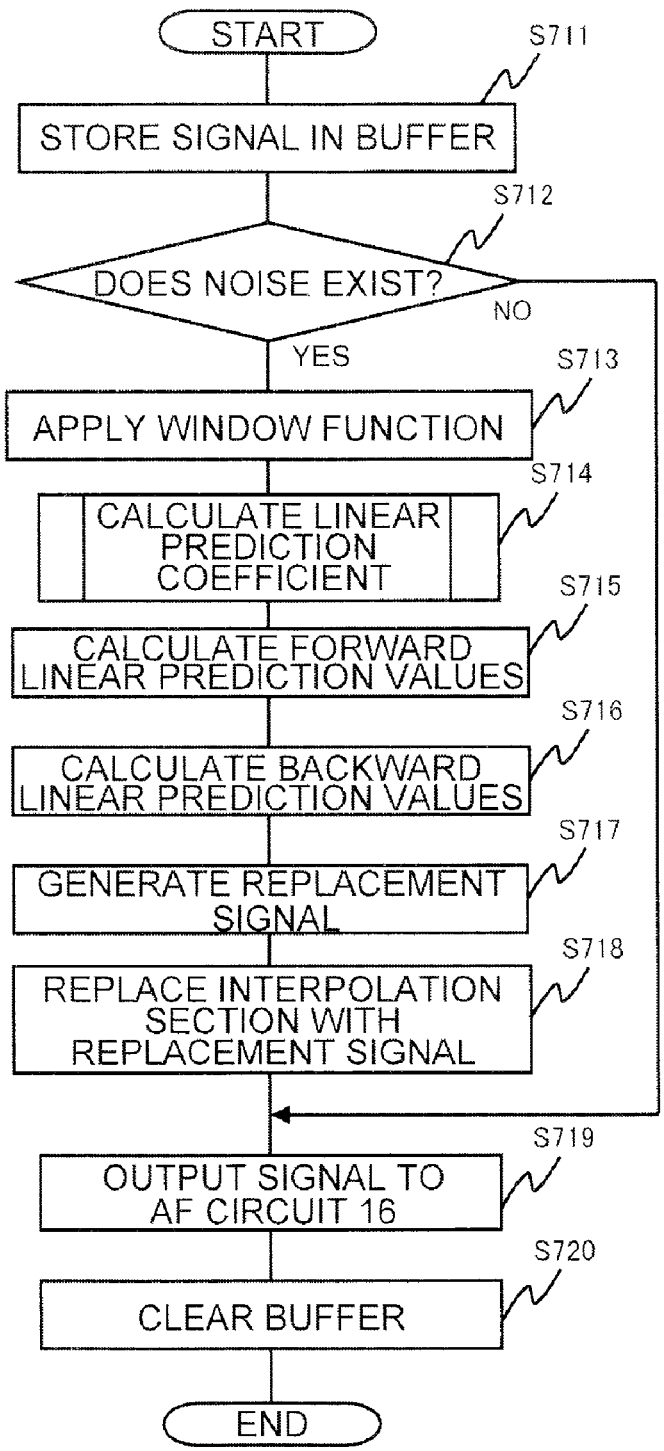
FIG. 7 is a flowchart describing the specific operation of the noise canceller 15 according to one embodiment of the present invention.

Description will be made of the specific operation of the noise canceller 15 with reference to a flowchart shown in FIG. 7. In the process at S711 of FIG. 7, the noise canceller 15 receives the signal input from the detection circuit 13 and stores the signal into the buffer 151. The noise canceller stores the noise detection signal output from the noise detection circuit 14 into the buffer 152 (S711). The noise canceller 15 takes in the signal stored in the buffer 151 as a data block with a predetermined data size. Along with the data block that is a target of noise detection, the noise canceller 15 stores into the buffer 151 other data blocks including signals continued from the signals included in the data block in the temporally forward or backward direction together. In this way, the buffer 151 at least stores the signals corresponding to a section including both the basis values $x_1, x_2, \ldots, x_M$ for generating the forward linear prediction values $y_{M+1}, y_{M+2}, \ldots y_{M+N}$ and the basis values $x_{2M+N}, x_{2M+N-1}, \ldots, x_{M+N+1}$ for generating the backward linear prediction values $z_{M+N}, z_{M+N-1}, \ldots, z_{M+1}$ in the interpolation section and, for example, even if the noise is included in the vicinity of the beginning or end of one data block, the basis values $x_1, x_2, \ldots, x_M$ for generating the forward linear prediction values and the basis values $x_{2M+N}, x_{2M+N-1}, \ldots, x_{M+N+1}$ for generating the backward linear prediction values always exist in the buffer 151.

In the next process at S712, the output changeover controller 159 determines whether or not the noise detection signals stored in the buffer 152 include a signal indicating that "noise exists" (S712). If the noise detection signals do not include the signal indicating that "noise exists" (S712, NO), the procedure goes to S719. Therefore, the signals stored in the buffer 151 are output directly to the AF circuit 16 in this case.

On the other hand, in the process at S712, if the noise detection signals include the signal indicating that "noise exists" (S712, YES), the procedure goes to the process of S713. At S713, the signal stored in the buffer 151 is applied with (multiplied by) the window function by the window function processor 153 (S713). The utilized window function is a window function suitable for the size of the data block that is the target of the noise detection. In the next process at S714, the linear prediction calculating unit 154 calculates the linear prediction coefficient $a_k^{[M]}$ based on the signal to which the window function is applied (S714). The specific calculating method of the linear prediction coefficient $a_k^{[M]}$ will be described later. In the process at S715, the forward linear prediction processor 155 calculates the forward linear prediction values $y_{M+1}, y_{M+2}, \ldots, y_{M+N}$ (S715). In the process at S716, the backward linear prediction processor 156 calculates the backward linear prediction values $z_{M+1}, z_{M+2}, \ldots, z_{M+N}$ (S716). In the next process at S717, the signal generator 157 generates the replacement signal by internally dividing the forward linear prediction values $y_{M+1}, y_{M+2}, \ldots, y_{M+N}$ obtained at S715 and the backward linear prediction values $z_{M+N}, z_{M+N-1}, \ldots, z_{M+1}$ obtained at S716 with the predetermined internal division ratio $c_1:c_2$ (S717). At S718, the output changeover controller 159 replaces the signal in the interpolation section in the signals stored in the buffer 151 with the replacement signal (S718).

In the process at S719, the output changeover controller 159 outputs the signals stored in the buffer 151 to the AF circuit 16 (S719). At S712, if the noise detection signals include the signal indicating that "noise exists" (S712, YES), the signals output to the AF circuit 16 have been replaced in the interpolation section at S718. At S712, if the noise detection signals do not include the signal indicating that "noise exists" (S712, NO), the signals stored in the buffer 151 are output directly to the AF circuit 16.

In the next process at S720, the noise canceller 15 initializes the contents of the buffer 151 and the buffer 152 in preparation for capturing the next signal (S720).

Figure 8:
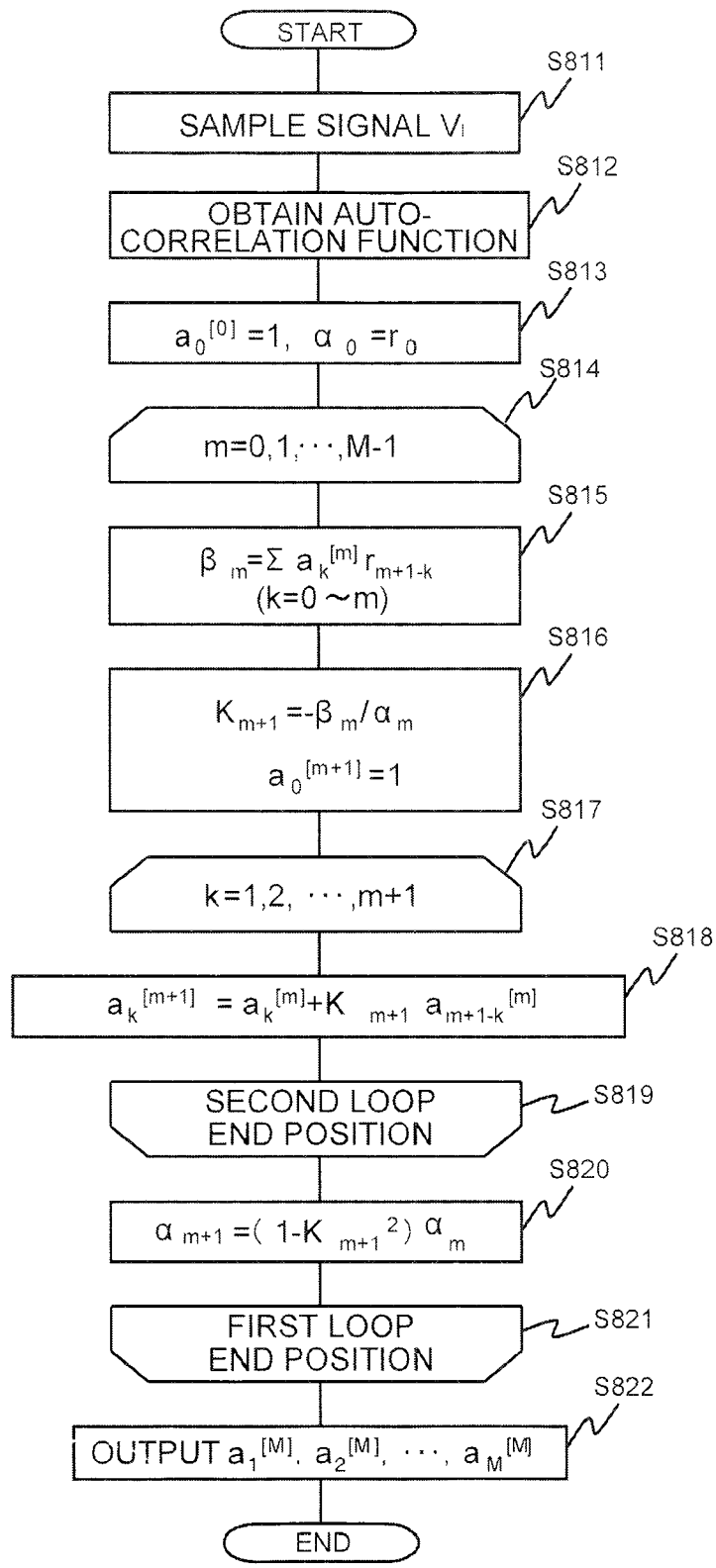
FIG. 8 is a flowchart describing a calculating process for a linear prediction coefficient according to one embodiment of the present invention.
Figure 9:
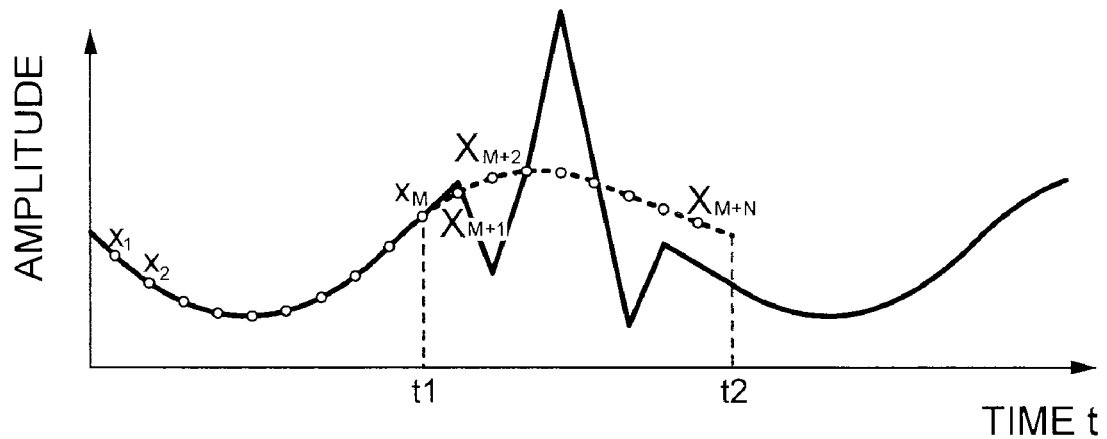
FIG. 9 is a diagram describing the expansion of the prediction error due to the forward linear prediction.

Description will be made of the calculating process for the linear prediction coefficient at S714 with reference to a flowchart shown in FIG. 8. It is assumed that the linear prediction calculating unit 154 uses the Levinson-Durbin recursion to calculate the linear prediction coefficient. In the process at S811 shown in FIG. 8, the linear prediction calculating unit 154 samples all signals $V_l$ ($l=1, 2, \ldots, L$) stored in the buffer 151. L is the buffer size (S811). In the process at S812, the linear prediction calculating unit 154 obtains an auto-correlation function $r_j$ ($j=0, 1, \ldots, M$) by substituting the sampled basis values $V_l$ ($l=1, 2, \ldots, L$) for the following equation (4) (S812).

$$r_j = \sum_{n=0}^{L-j} v_n v_{n-l} \qquad (4)$$

In the process at S813, prearrangement is performed for a subsequent process by defining $a_0^{[0]}=1$, $\alpha_0=r$ (S813).

S814 is a starting position of a first loop. In the first loop, the value of m is changed from zero to M−1 (S814). In the process at S815, $\beta_m$ is obtained from the following equation (5) (S815).

$$\beta_m = \sum_{k=0}^{m} a_k^{[m]} \cdot r_{m+1-k} \qquad (5)$$

At S816, $K_{M+1}$ is obtained from the following equation (S816). $a_0^{[m+1]}=1$ is also defined.

$$K_{m+1} = -\beta_m/\alpha_m \qquad (6)$$

S817 is a starting position of a second loop. In the second loop, the value of k is changed from one to m+1 (S817). In the process at S818, $a_k^{[m+1]}$ is obtained from the following equation (7) (S818).

$$a_k^{[m+1]} = a_k^{[m]} + K_{m+1} a_{m+1-k}^{[m]} \qquad (7)$$

S819 is an end position of the second loop (S819). In the process at S820, $\alpha_{m+1}$ is obtained from the following equation (8) (S820).

$$\alpha_{m+1} = (1 - K_{m+1}^2)\alpha_m \qquad (8)$$

S821 is an end position of the first loop (S821).

At S822, the linear prediction calculating unit 154 outputs the linear prediction coefficients $a_1^{[M]}, a_2^{[M]}, \ldots, a_M^{[M]}$ obtained as above to the forward linear prediction processor 155 and the backward linear prediction processor 156 (S822).

As described above, the noise canceller 15 of the embodiment predicts the signal with both the forward linear prediction and the backward linear prediction. Therefore, the waveform of the original signal can be reproduced highly accurately and the sound quality can be improved in the reproduced sound of the AM broadcasting receiver 1.

Although the preferred specific example of the present invention has been described as above, it should be understood that various changes and alternatives may be achieved without impairing the spirit and the scope of the present invention defined by appended claims.

For example, the noise canceller 15 can be constituted by an MPU (Micro Processor Unit), hardware logic, etc., other than the DSP. The buffer 151 and the buffer 152 may be built into the noise canceller 15 as shown in FIG. 4 or may be separated from the noise canceller 15. The noise detection signal can also be generated based on the output signal of the FE circuit 11, the output signal of the detection 13, etc., other than the output signal of the IF circuit as described above. The noise canceller 15 of the embodiment can be applied not only to the AM receiver but also to an FM receiver, for example.

By the way, if a plurality of noise portions (sections where a reception signal includes noise) is included in a short time section, the auto-correlation function is calculated many times in a short time period, and the processing load of the noise canceller 15 is increased. To prevent the increase in the processing load, a set of the linear prediction coefficients may be obtained in the forward linear prediction and the backward linear prediction based on the basis values sampled in a predetermined time section Δt to generate the replacement signals with the linear prediction coefficients for a plurality (or all) of the noise portions that are the replacement targets in the time section Δt, that is, the replacement signals may be generated for a plurality (or all) of the noise portions that are the replacement targets in the time section Δt based on the same set of the linear prediction coefficients. In this way, the linear prediction coefficient is not calculated in a time period shorter than the time section Δt and the increase in the processing load can be prevented.

What is claimed is:

1. A noise canceller comprising:
   a forward linear prediction processor that performs forward linear prediction for a noisy section of a reception signal in a section of the reception signal which includes noise as indicated by a noise detection signal to obtain forward linear prediction values for a plurality of points in the noisy section of the reception signal, the noisy section of the reception signal corresponding to a section of the reception signal that contains noise as indicated by a noise detection signal;
   a backward linear prediction processor that performs backward linear prediction for the noisy section of the reception signal to obtain backward linear prediction values for the plurality of points;
   a signal generator that obtains replacement values for the plurality of points to generate a replacement signal including the replacement values, the replacement value for each of the plurality of points being generated based on both of the corresponding forward linear prediction value and the corresponding backward linear prediction value; and
   an output changeover controller that outputs the replacement signal in place of the noisy section of the reception signal and outputs the reception signal where the reception signal does not contain noise, based on the noise detection signal,
   wherein the signal generator obtains the replacement value for each of the plurality of points by weighting the corresponding forward prediction value and the corresponding backward prediction value with an internal division ratio, the internal division ratio having a linear or nonlinear function relationship to the time axis of the signal.

2. The noise canceller of claim 1,
   wherein the internal division ratio is set to have a cubic function relationship relative to the time axis of the signal.

3. The noise canceller of claim 1, comprising:
   a buffer that stores the reception signal including basis values for generating the forward linear prediction values and basis values for generating the backward linear prediction values.

4. The noise canceller of claim 3 wherein the buffer takes in the reception signal as a data block with a predetermined data size, and
   wherein the buffer stores together a plurality of data blocks including the reception signals continued in the temporally forward or backward direction.

5. The noise canceller of claim 1,
   wherein a linear prediction coefficient for the forward linear prediction or backward linear prediction is obtained by the Levinson-Durbin recursion or the Yule-Walker equation.

6. The noise canceller of claim 1, wherein, when a plurality of noisy sections of the reception signal occur within a short time interval,
   the forward linear prediction processor and the backward linear prediction processor obtain a set of linear prediction coefficients for the forward linear prediction and backward linear prediction, respectively, based on sampling values in a predetermined time section, and
   the signal generator generates a plurality of replacement signals to replace the respective plurality of sections of the reception signal which contain noise based on the forward linear prediction values obtained by the forward linear prediction based on the set of linear prediction coefficients and the backward linear prediction values obtained by the backward linear prediction based on the set of linear prediction coefficients.

7. An amplitude-modulated (AM) radio receiver, comprising:
   a front-end circuit that converts an AM radio signal to an intermediate frequency (IF) signal;
   a detection circuit that performs AM detection to convert the IF signal to a reception signal;
   a noise detection circuit that determines whether or not an amplitude of noise contained in the IF signal is greater than a predetermined amplitude and outputs a noise detection signal indicating a detection result; and
   a noise canceller comprising:
      a forward linear prediction processor that performs forward linear prediction for a noisy section of the reception signal to obtain forward linear prediction values for a plurality of points in the section of the reception signal, the noisy section of the reception signal corresponding to a section of the IF signal that contains noise as indicated by the noise detection signal;
      a backward linear prediction processor that performs backward linear prediction for the noisy section of the reception signal to obtain backward linear prediction values for the plurality of points;

a signal generator that obtains replacement values for the plurality of points to generate a replacement signal including the replacement values, the replacement value for each of the plurality of points being generated based on both of the corresponding forward linear prediction value and the corresponding backward linear prediction value; and an output changeover controller that outputs the replacement signal in place of the noisy section of the reception signal and outputs the reception signal where the reception signal does not contain noise, based on the noise detection signal, wherein the signal generator obtains the replacement value for each of the plurality of points by weighting the corresponding forward prediction value and the corresponding backward prediction value with an internal division ratio, the internal division ratio having a linear or nonlinear function relationship to the time axis of the signal.

* * * * *